United States Patent
Gangwal et al.

(10) Patent No.: US 11,265,469 B1
(45) Date of Patent: Mar. 1, 2022

(54) SYSTEM TO MITIGATE IMAGE JITTER BY AN ACTUATOR DRIVEN CAMERA

(71) Applicant: AMAZON TECHNOLOGIES, INC., Seattle, WA (US)

(72) Inventors: Om Prakash Gangwal, Fremont, CA (US); Jonathan Ross, Boston, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/845,651

(22) Filed: Apr. 10, 2020

(51) Int. Cl.
H04N 5/232 (2006.01)

(52) U.S. Cl.
CPC ..... *H04N 5/23258* (2013.01); *H04N 5/23267* (2013.01); *H04N 5/23287* (2013.01)

(58) Field of Classification Search
CPC ........... H04N 5/23248; H04N 5/23261; H04N 5/23277; H04N 5/23258; H04N 5/23267; H04N 5/23287
See application file for complete search history.

(56) References Cited

U.S. PATENT DOCUMENTS

| | | | |
|---|---|---|---|
| 7,382,400 B2 | 6/2008 | Sablak | |
| 8,896,697 B2 | 11/2014 | Golan et al. | |
| 9,696,404 B1 | 7/2017 | Doyle et al. | |
| 9,781,350 B2 | 10/2017 | Gao et al. | |
| 2005/0280707 A1 | 12/2005 | Sablak et al. | |
| 2008/0055413 A1* | 3/2008 | Hayashi | H04N 5/23296 348/169 |
| 2012/0002082 A1* | 1/2012 | Johnson | H04N 5/2356 348/234 |
| 2014/0267851 A1* | 9/2014 | Rhoads | H01L 27/14625 348/294 |
| 2018/0295270 A1* | 10/2018 | Oshima | H04N 7/183 |
| 2019/0104255 A1* | 4/2019 | Shi | G06T 5/003 |
| 2019/0191082 A1* | 6/2019 | Uehara | H04N 5/23287 |
| 2019/0191090 A1* | 6/2019 | Murashima | G02B 27/646 |

FOREIGN PATENT DOCUMENTS

JP 2003101863 A 4/2003

* cited by examiner

Primary Examiner — Amy R Hsu
(74) Attorney, Agent, or Firm — Lindauer Law, PLLC (57) ABSTRACT

A device has a camera that is moveable by one or more actuators. During operation the camera moves. For example, the camera may move to follow a user as they move within the physical space. Mechanical limitations result in the camera movement exhibiting discontinuities, such as small jerks or steps from one orientation to another while panning. If the camera is acquiring video data while moving, the resulting video data may appear jittery and be unpleasant for a user to view. An offset is determined between an intended orientation of the camera at a specified time and an actual orientation of the camera at that time. A portion of raw image data acquired at the specified time is cropped using the offset to produce cropped image data that is free from jitter due to the movement discontinuities.

20 Claims, 7 Drawing Sheets

SYSTEM TO MITIGATE IMAGE JITTER BY AN ACTUATOR DRIVEN CAMERA

BACKGROUND

Motors may be used to move a camera to different orientations. Limitations in the mechanical operation may result in unpleasant jitter in resulting video imagery.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Various devices may have cameras that are moveable by one or more actuators. In one implementation, a device may be able to move with respect to one or more axes. For example, the device may rest on a surface such as a table or countertop. An actuator such as a motor may be used to rotate the device with respect to a vertical axis. By rotating the device, a camera of the device and the corresponding field of view (FOV) of the camera is able to be panned left and right with respect to a physical space. During operation, this panning may allow the device to follow a person in the physical space. For example, during a video call, video of a user of the device may be obtained by a camera on the device while a display device shows video of a person the user is communicating with. As the user moves about the environment, a system may use the one or more actuators to move the device, or portion to which the camera is affixed, to attempt and maintain the user within the FOV of the camera.

Movement of a moveable portion of the device that includes the camera may be accomplished by the one or more actuators. However, operation of these actuators may result in discontinuities in the movement of the camera. These discontinuities introduce a difference between an intended orientation of the camera and an actual orientation of the camera. These discontinuities may be due to mechanical linkages, driving electronics, and so forth. For example, slack, backlash, and so forth in the mechanical linkages may result in oversteering or understeering of the moveable portion relative to the intended orientation. In another example, the actuator may have a minimum amount of movement that can be accomplished, such as with a stepper motor. Regardless of the source, a difference between the intended orientation that points the camera in a particular direction and the actual orientation which the camera is pointing is likely to occur.

In situations where image data is being acquired while the camera is moving, these discontinuities can result in "jitter" of depicted objects in the resulting raw images. For example, the jitter may be visualized as a "stutter" in which the orientation of the camera changes abruptly between frames of video. As a result, a viewer of the video would see the objects apparent in the video appear to "jump" or be displaced relative to their prior position on the display screen. Jitter in video imagery may increase fatigue in the user viewing the video and generally results in a poor user experience.

Described in this disclosure are techniques for combining mechanical motion of at least a moveable portion of a device and dynamic image cropping of raw images to produce cropped images in which the jitter has been mitigated. The actuators in the device may be operated based on instructions to move the moveable portion to place the camera in an intended orientation. These instructions may come from various sources such as a computer vision-based system, commands obtained from a remote user to move the camera, and so forth.

The instructions may designate, or may be used to determine, an intended orientation. For example, the instructions may direct the device to rotate +49 degrees from a current position. The actuators are operated in accordance with the instructions, and as of a first time, the device is rotated.

One or more sensors may acquire sensor data about the device and the space around the device. For example, the sensors may include the camera, a microphone array, and so forth. Data from the different sensors may be associated with a common coordinate system relative to the device and be synchronized.

The one or more sensors provide information about the actual orientation data at the first time. The one or more sensors may comprise an inertial measurement unit (IMU), a position encoder, and so forth. For example, the movements leading up to the first time may be measured by one or more accelerometers or gyroscopes in the IMU, and may be integrated to determine how far the device has rotated. In another example, a position encoder may provide information about the relative movement between the device and a foot upon which the device rests.

A difference between the intended orientation and the actual orientation is used to determine offset data that is associated with a particular time. For example, assume the device has a single degree of freedom from the actuators to rotate about a vertical axis (panning). The intended orientation is +49 degrees at the first time, but the actual location may be +37 degrees. As a result, the camera is not pointed in the desired direction at the first time.

The camera may have a resolution greater than that used by other applications, such as a video call application. For example, the camera may have a resolution of 4224×3136 pixels (width×height) and produces raw image data at this resolution. Continuing the example, the video call application may use only a portion of this image, such a 1920×1080 subset that has been cropped from the raw image data. In other implementations, the cropping may be done for various reasons, such as to limit how much of the scene is presented, and so forth.

During operation of the system, the device may follow an entity, such as a user as they move, in a physical space relative to the device. In one implementation, computer vision techniques may be used to determine a presence, and apparent position, of a face in the raw image data. In some implementations, the raw image data may be downscaled and that downscaled data used by a computer vision system. Depending on the operating mode in use, once determined the device may attempt to follow that face and try to keep it centered.

A cropped image boundary is specified with respect to the raw image. For example, the cropped image boundary may be a central portion of the raw image when the camera is not moving. In some implementations, the cropped image boundary may be centered on the apparent position of the face in the raw image.

When the camera is being moved by the actuators responsive to the instructions, the discontinuities in physical motion may occur. The offset data described above is indicative of how the cropped image boundary is to be shifted with respect to the raw image acquire at the first time. For example, if the offset data indicates a +12 degree difference at the first time, the offset data may indicate that the cropped image boundary is to be shifted +89 pixels with respect to the raw image acquired at the first time. The cropped image boundary is then used to generate cropped image data for the first time. The process may be repeated, providing an ongoing adjustment to video, producing video output that substantially mitigates or eliminates altogether jitter. As a result, the image is more easily and comfortably viewed by human users.

Additionally, the significant reduction or elimination of jitter may improve performance of other automated systems using the video data. For example, by removing the jitter, a computer vision system that attempts to recognize and follow a particular user in the scene may be significantly improved by improving frame-to-frame consistency.

The system described in this disclosure is applicable to situations in which image data is being acquired of an object that is moving relative to the camera, both the object and camera are moving, and so forth. The system described herein mitigates image jitter and as such is distinct from and may be used with or without other image processing techniques, such as electronic image stabilization, optical image stabilization, and so forth. For example, electronic image stabilization may be used to reduce blurring due to vibration of the camera while jitter mitigation removes the frame-to-frame jitter due to actuator discontinuities.

Illustrative System

Figure 1:
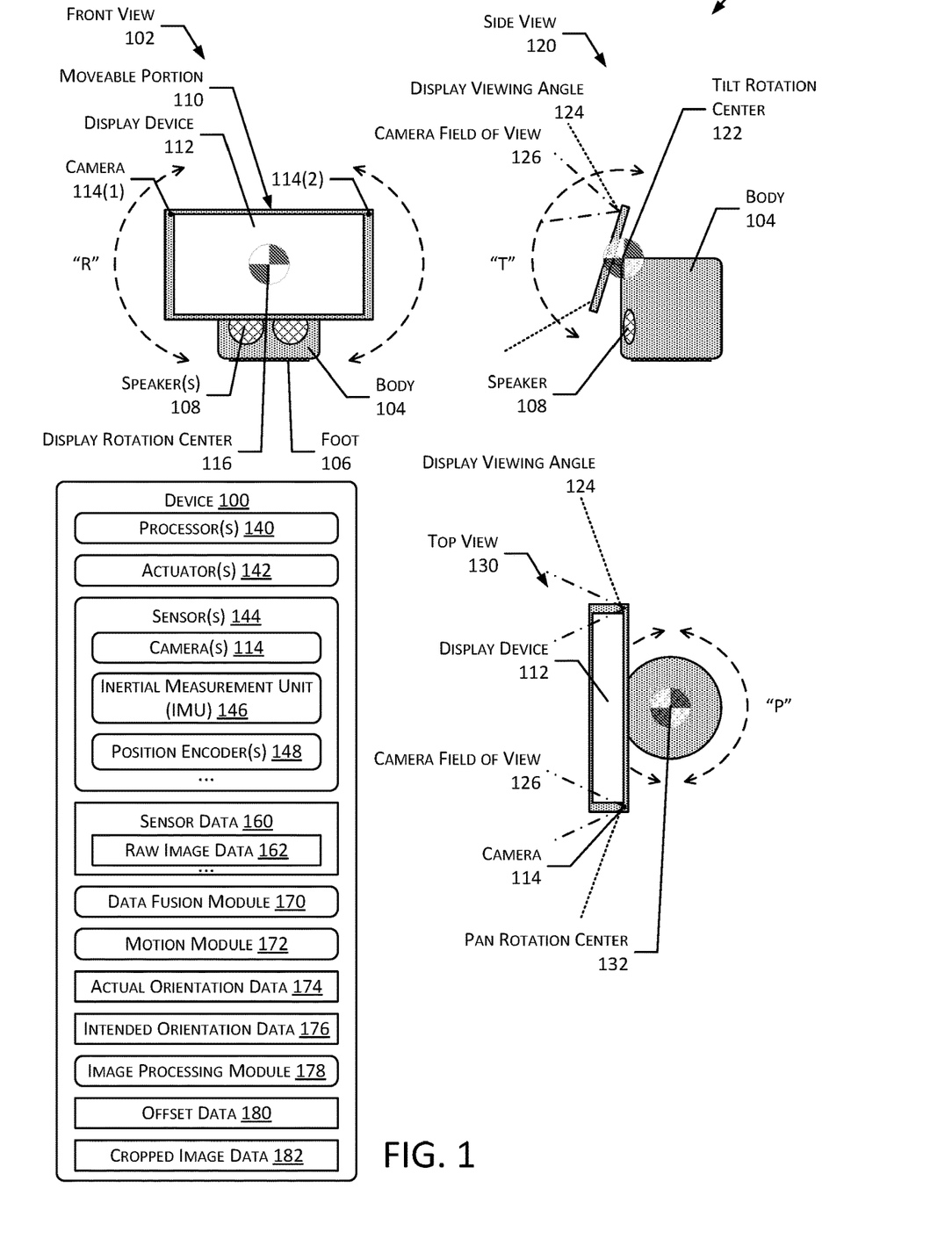
FIG. 1 illustrates a device that may implement a system to mitigate jitter by an actuator driven camera, according to some implementations.

FIG. 1 illustrates a device 100 that may implement a system to mitigate image jitter by an actuator driven camera, according to some implementations. A front view 102 of a device 100 is shown. The device 100 may include a body 104 that is supported by a foot 106. The device 100 may include one or more speakers 108. For example, the speakers 108 may be mounted within the body 104 as shown here. The device 100 may include a moveable portion 110 that can move with at least one degree of freedom with respect to the body 104. The moveable portion 110 of the device 100 may include a display device 112, one or more camera(s) 114, and so forth. In some implementations the moveable portion 110 may be able to rotate, relative to the body 104, in a direction "R" with respect to a display rotation center 116. For example, the moveable portion 110 may be able to rotate about an axis that is perpendicular to a plane of the display device 112 and centered on the display rotation center 116.

A side view 120 of the device 100 shows some additional features. In some implementations, the moveable portion 110 may tilt with respect to the body 104. For example, the moveable portion 110 may be rotatable with respect to a tilt rotation center 122 that allows the moveable portion 110 to be rotated in direction "T".

A display viewing angle 124 is shown indicating a viewable area associated with the display device 112. A camera field of view (FOV) 126 is also shown. The camera FOV 126 indicates with a dashed line the solid angle within which one of the cameras 114 obtains an image of a scene in a physical space.

A top view 130 also depicts the display device 112 and associated display viewing angle 124 and the camera(s) 114 and associated camera FOV 126. The device 100 may rotate along a vertical axis centered on a pan rotation center 132. For example, the device 100 may pan to orient the camera(s) 114 in a particular direction.

The device 100 may include a power source (not shown) to provide electrical power suitable for operating the components in the device 100. For example, power may be provided by connection to an external power source such as a building main, batteries, wireless power transfer, capacitors, fuel cells, and so forth.

The device 100 may include one or more hardware processors 140 (processors) configured to execute one or more stored instructions. The processors 140 may comprise one or more cores. The processors 140 may include microcontrollers, systems on a chip, field programmable gate arrays, digital signal processors, graphic processing units, general processing units, and so forth.

The device 100 includes one or more actuators 142. The actuators 142 may comprise one or more of a motor, solenoid, piezoelectric material, electroactive polymer, shape-memory alloy, and so forth. The actuators 142 produce movement in one or more of the device 100 relative to an external environment, relative motion between parts of the device 100, and so forth. For example, an actuator 142 may be used to pan or rotate the body 104 relative to the foot 106, producing rotation about the pan rotation center 132. In another example, an actuator 142 may be used to move the moveable portion 110 relative to the body 104.

Operation of the actuators 142 and associated mechanical linkages and mechanisms may result in discontinuous motion of the device 100. For ease of discussion, and not necessarily as a limitation, unless otherwise noted the actuator 142 may include the mechanical components associated with producing a movement of the device 100 or a portion thereof. For example, the actuator 142 may include mechanisms such as gears, cams, linkages, and so forth. In addition to the actuator 142 itself, these associated mechanisms may introduce stiction, slack, backlash, and so forth.

As a result of these discontinuities, the motion produced by an actuator 142 may not be perfectly smooth from one instant to another. For example, the actuator 142 that pans the device 100 may not provide a motion that is perfectly smooth. When commanded to pan the device 100, the actuator 142 may actually move in small increments, starting, stopping, starting, stopping, and so on. Over the span of a second or two the motion may appear smooth, but at shorter intervals of time, the device 100 as moved by the actuator 142, assumes a first orientation at a first time, then surges to a second orientation at a second time, and so forth.

As mentioned above, the device 100 includes one or more cameras 114. The camera(s) 114 may be used to acquire raw image data 162. For example, the camera(s) 114 may obtain video at 30 frames per second (FPS). If the device 100 is panning while obtaining video, the discontinuous motion introduces "jitter" in which the orientation of the camera changes abruptly between frames of video. In some implementations the jitter experienced during panning may be expressed as a variable rate of angular change per unit time between successive frames. For example, the camera 114 may pan 1 degree between frames 1 and 2, and then 5 degrees between frames 2 and 3, then 1 degree between frames 3 and 4, and so on. The variation in orientation of 5 degrees produces an apparent jitter between frames 2 and 3. Jitter in video may increase fatigue in a user viewing the video. Jitter may also produce an unpleasant aesthetic effect, and may generally result in a poor user experience.

The presence of jitter may also degrade performance of automated systems using the video. For example, the device 100 may use a computer vision system that attempts to recognize and follow a particular user or other object in the raw image data. The computer vision system may experience degraded performance in trajectory estimation if the apparent position of the user jumps between successive images such as to jitter.

The device 100 may include one or more sensors 144. The sensors 144 may include camera(s) 114, inertial measurement unit(s) (IMU) 146, position encoder(s) 148, microphone arrays (not shown), radar, sonar, depth cameras, a radio receiver, and so forth.

The IMU 146 may include a plurality of gyroscopes and accelerometers arranged along different axes. The gyroscope may provide information indicative of rotation of an object affixed thereto. The accelerometer provides information indicative of a direction and magnitude of an imposed acceleration. Data such as rate of change, determination of changes in direction, speed, and so forth may be determined using one or more of the accelerometer or the gyroscope. The IMU 146 may comprise mechanical, optical, microelectromechanical, or other devices. The IMU 146 may include the gyroscope and the accelerometer in a prepackaged solid-state unit.

Output from the IMU 146 may be used to determine movement of at least a portion of the device 100. Output from the IMU 146 may be integrated to determine actual movement. For example, output from an IMU 146 may indicate how far the device 100 has rotated with respect to the pan rotation center 132 from a first time to a second time. In another example, an IMU 146 mounted on the moveable portion 110 may be used to determine the tilt of the moveable portion 110 by detecting a variation from local vertical due to gravitational acceleration.

The position encoders 148 provide information indicative of a position of at least a portion of an actuator 142. The position encoder 148 may be integral with an actuator 142, or may be an external device added or used in conjunction with the actuator 142. In one implementation an integral position encoder 148 may utilize hall effect sensors, magnets, and other components within a rotary motor to determine rotation of a shaft. For example, a brushless direct current (BLDC) motor or a controller used to drive the BLDC may provide information as to rotational speed, rotational count, rotational direction, and so forth. In another implementation, an optical encoder using a photodiode and light to detect a code printed on an encoder wheel may be used. In another implementation, a combination of techniques may be used. For example, an optical encoder may be used to determine a reference point, such as a zero value. Subsequently, data from a motor encoder integrated into an electric motor may be used to determine a position relative to the reference point.

During operation, the sensors 144 acquire sensor data 160. The sensor data 160 includes raw image data 162162 acquired by the camera(s) 114. The camera(s) 114 acquires images of a scene and produces raw image data 162 during operation. In some implementations the camera(s) 114 may comprise a charge coupled device (CCD), complementary metal oxide semiconductor (CMOS) device, microbolometer, and so forth. The device 100 or systems in communication with the device 100 may use at least a portion of the raw image data 162 acquired by the camera(s) 114 for object recognition, user communication, and so forth. For example, the camera(s) 114 may be used for videoconferencing or for acquiring pictures for the user.

The raw image data 162 produced by the camera 114 may represent the scene within the camera FOV 126. The raw image data 162 produced by the camera 114 may have a resolution greater than that used by other applications, such as a video call application, security application, photography application, and so forth. For example, the camera may have a resolution of 4224×3136 pixels (width×height) and produces raw image data 162 with this resolution. In comparison, the video call application may use only a portion of this image, such a 1920×1080 subset that has been cropped from the raw image data 162. In other implementations, cropping may be done for other reasons and applications. In addition to cropping, in some implementations the cropped image may also be scaled to a specified resolution. For example, the cropped image may be scaled to 1280×720 pixels.

The sensor data 160 may comprise data from the other sensors 144. For example, the sensor data 160 may comprise data from the microphone array, radar, radio receiver, and so forth. The sensor data 160 may be processed by a data fusion module 170.

The data fusion module 170 may perform one or more functions. The data fusion module 170 may transform coordinates about the location of a user from sensor-specific coordinate systems to a common coordinate for the device 100. For example, a sonar sensor may determine range and bearing to an obstacle with respect to the body 104. That range and bearing may be converted into a common coordinate system indicative of a location in the physical space.

The data fusion module 170 may synchronize the sensor data 160 obtained from a plurality of the sensors 144. Different sensors 144 may generate sensor data 160 at different rates. For example, the camera(s) 114 may acquire raw image data 162 at 30 frames per second (FPS) while the microphone array acquires audio data with a sampling rate of 48,000 times per second. Processing of different types of data may vary in timing, introducing latency into when sensor data 160 is available. The data fusion module 170 may synchronize sensor data 160, allowing sensor data 160 from different sensors 144 to be associated with a common time interval. For example, the audio data acquired by the microphone array may be synchronized with the raw image data 162.

A motion module 172 may execute at least in part on the processor 140. The motion module 172 may determine or receive one or more movement instructions that direct one or more of the actuators 142 to move at least a portion of the device 100. For example, the movement instructions may direct an actuator 142 to pan the device 100 to a relative position of +49 degrees at a first time. Responsive to these movement instructions, the motion module 172 operates the actuator 142.

The motion module 172 may attempt to may have the device 100 follow an entity, such as a user, that is moving in the scene. For example, the motion module 172 may use one or more of output from the microphone array, the raw image data 162, and so forth to determine where the user is relative to the device 100. Once determined, movement instructions may be generated that direct the device 100 to turn towards the object or where the object is expected to be at the first time. In one implementation, during a video call the motion module 172 attempts to keep a particular user centered in the video being sent. In implementations such as depicted here where the display device 112 and the camera 114 are mounted adjacent one another, such action of following also helps maintain the user within a central viewing area of the display device 112, allowing the user to more clearly see the image on the display device 112.

The movement instructions result in movement of the camera 114. If not addressed, such movement would produce unwanted jitter in the raw image data 162 acquired while the camera 114 is moving.

The motion module 172 may receive or determine actual orientation data 174. The actual orientation data 174 indicates the actual orientation of the device 100 or a portion thereof at a particular time. The actual orientation data 174 may be determined based on output from one or more of the sensors 144. For example, the actual orientation data 174 may be provided by a position encoder 148 of the actuator 142, indicating that as of a first time, the actual rotation is +37 degrees. The actual orientation data 174 may be specified as one or more angular values indicative of angles, coordinates with respect to one or more axes, and so forth.

The motion module 172 may receive or determine intended orientation data 176. The intended orientation data 176 may be specified as one or more angles, coordinates with respect to one or more axes, and so forth. In one implementation, the motion module 172 may determine movement instructions to place the device 100 at the relative position of +49 degrees at the first time.

An image processing module 178 may accept as input the raw image data 162, the actual orientation data 174, and the intended orientation data 176. The actual orientation data 174 and the intended orientation data 176 are used to determine offset data 180. For example, a difference may be calculated between the actual orientation data 174 and the intended orientation data 176. The difference may then be used to access data in a data structure, such as a lookup table. Continuing the example, the actual orientation data 174 may indicate a pan movement of +37 degrees from a zero time to a first time. The intended orientation data 176 was a pan movement of +49 degrees. As a result, the difference is +12 degrees from the intended orientation desired at the first time. The difference of +12 degrees may be used to retrieve offset data 180 from a data structure, such as a lookup table. For example, the difference of +12 degrees may correspond to offset data 180 indicative of +89 pixels along a horizontal axis of the raw image data 162.

The offset data 180 indicates a displacement of a cropped image boundary relative to the raw image data 162. The offset data 180 may indicate a displacement with respect to the degrees of freedom introduced by operation of the one or more actuators 142. For example, if the device 100 only includes an actuator 142 to produce a pan motion about the pan rotation center 132, it exhibits only a single degree of freedom. The panning motion would produce a left-to-right apparent motion in the raw image data 162. Continuing this example, the offset data 180 indicates a displacement along the left-to-right apparent motion. In another example, if the device 100 included two degrees of freedom, such as pan and tilt, the offset data 180 may indicate displacement left-to-right and up-and-down with respect to the raw image data 162.

The image processing module 178 uses at least the offset data 180 to position a cropped image boundary. For example, the offset data 180 may indicate a displacement, relative to pixel coordinates in the raw image data 162, of a cropped image boundary. The raw image boundary and the cropped image boundary are discussed in more detail with regard to FIG. 3.

Once the location of the cropped image boundary has been specified with respect to the raw image data 162, the image processing module 178 determines cropped image data 182. For example, the pixel values associated with pixels in the portion of the raw image data 162 that are in the cropped image boundary may be stored as cropped image data 182. This is illustrated with regard to FIG. 4. The operation of the image processing module 178 provides as output the cropped image data 182 which compensates for the jitter associated with operation of the actuators 142. For example, video data comprising cropped image data 182 as described herein will exhibit no or minimal jitter compared to the raw image data 162.

Figure 2:
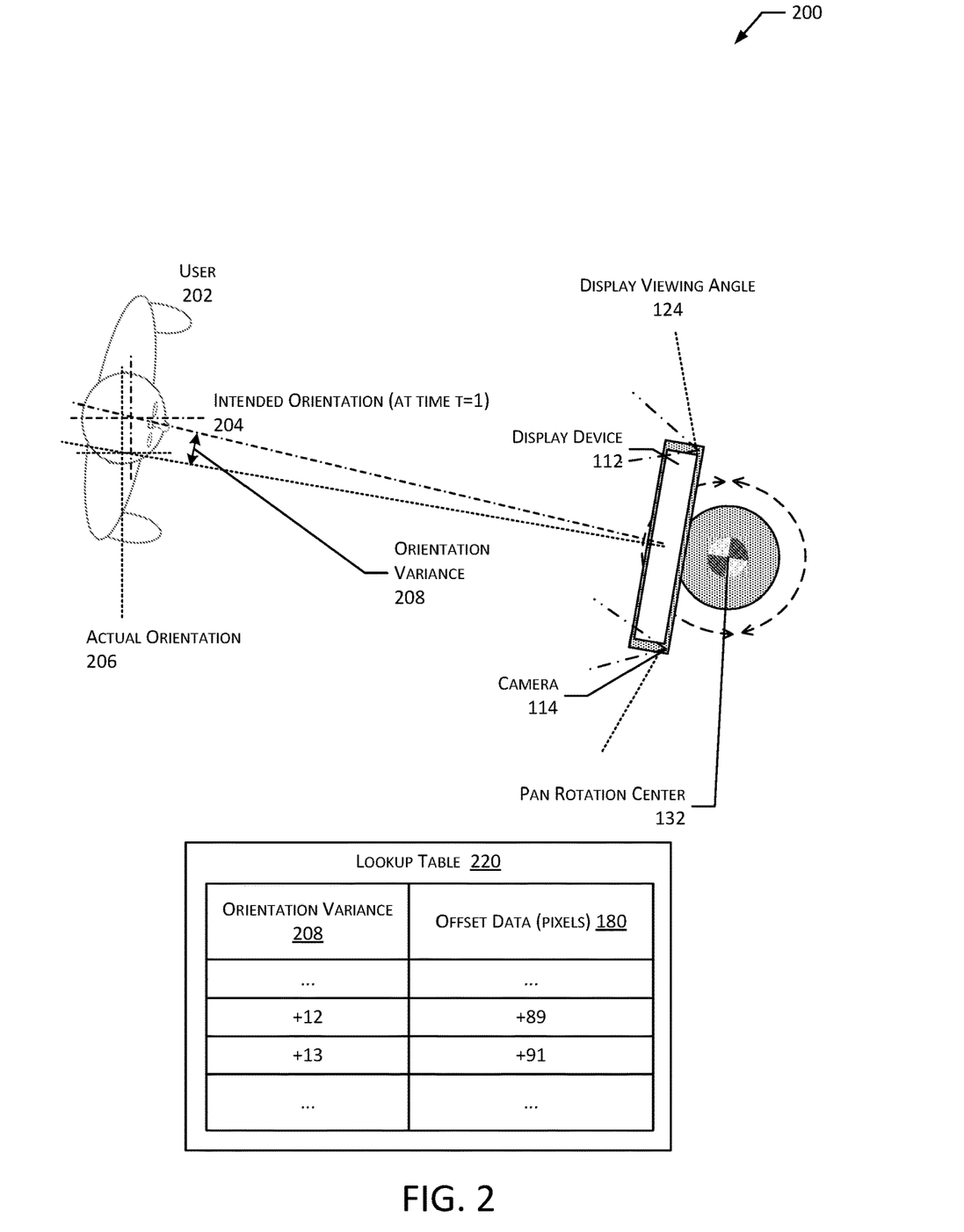
FIG. 2 illustrates an intended orientation of the device containing a camera as compared to an actual orientation, according to some implementations.

FIG. 2 illustrates at 200 an intended orientation of the device 100 containing a camera 114 as compared to an actual orientation at a first time, according to some implementations. In this illustration the device 100 is panning about the pan rotation center 132 to keep a user 202 centered within the camera FOV 126. The motion module 172 or other system has determined the intended orientation data 176 that is indicative of an intended orientation 204 of the device 100 at the first time, t=1. To move the device 100 to the intended orientation 204, determines movement instructions to operate the actuator 142 to pan the device 100 to the intended orientation 204. The intended orientation 204 at t=1 may be an orientation that is part of a longer sequence of intended orientation 204. For example, the intended orientation at t=1 may not involve explicitly stopping the device 100 in that orientation, but rather continuing to move to a second intended orientation 204 at t=2, and so forth.

As mentioned above, the actuators 142 may not move the device 100 or portion thereof to exactly the intended orientation 204 specified by the intended orientation data 176. Instead, the device 100, or portion thereof that includes the camera 114, has an actual orientation 206 at time t=1. This results in an orientation variance 208 representative of the difference between the intended orientation 204 and the actual orientation 206.

As described above, if the orientation variance 208 varies from frame to frame in video data, the resulting video may exhibit jitter.

Also shown is an example of a lookup table 220 that associates the difference or orientation variance 208 with the offset data 180. The image processing module 178 may use the lookup table 220 to determine the offset data 180 associated with a specified orientation variance 208.

Figure 3:
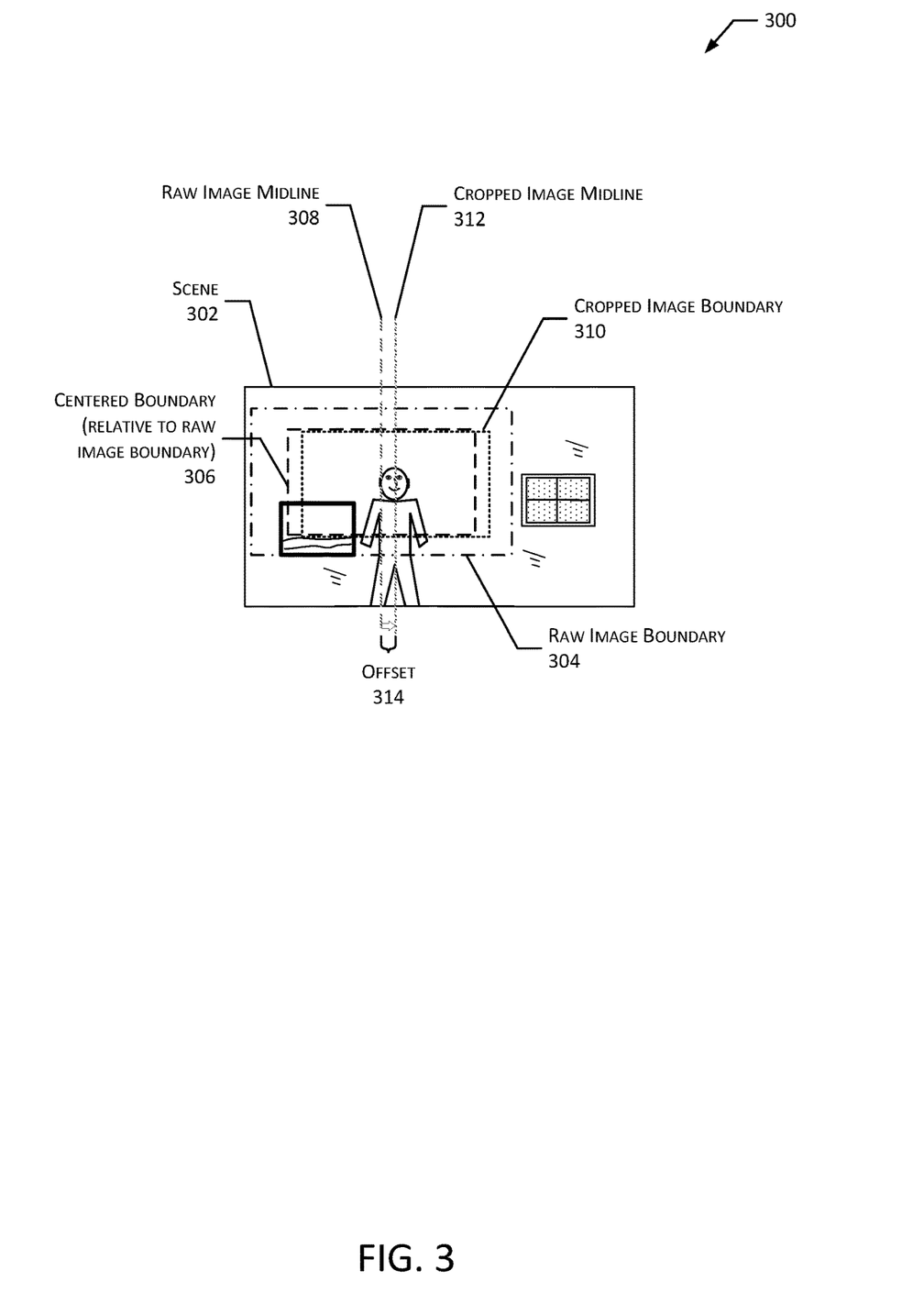
FIG. 3 illustrates a scene and various images and their boundaries, according to some implementations.

FIG. 3 illustrates a situation 300 including a scene 302 and various images and their boundaries, according to some implementations. The scene 302 may comprise the portion of the physical space in which the device 100 is present. A raw image boundary 304 is depicted that corresponds to a portion of the scene 302 that is within the camera FOV 126 at a given time, such as time t=1. The raw image data 162 may comprise the image data that represents the portion of the scene depicted within the raw image boundary 304. As described above, other applications or consumers of image data may use less than the complete raw image data 162. For example, a video call application using the raw image data 162 may only require a portion of the raw image data 162 measuring 1920×1080 pixels. For comparison and to facilitate description, a centered boundary 306 is shown relative to the center of the raw image boundary 306. To facilitate description, a raw image midline 308 is depicted, centered on the raw image boundary 304 and the centered boundary 306.

Also depicted is a cropped image boundary 310. The cropped image boundary 310 has been shifted, relative to the raw image boundary 304, by an offset 314. The offset 314 may be specified by the offset data 180. For example, the offset data 180 may specify a direction and a number of pixels. The offset data 180 may indicate the offset 314 with respect to one or more axes, such as width and height relative to the raw image data 162. The offset 314 may be used to translate, in the plane of the raw image data 162, the cropped image boundary 310. The offset 314 may be specified with respect to a corner, center, or other point associated with the cropped image boundary 310.

In this illustration, the cropped image boundary 310 has been shifted to the right, relative to the raw image boundary 304. This shift is readily apparent by the apparent position, with respect to the raw image boundary 304, of the vertical edges of the cropped image boundary 310 and the centered boundary 306. The resulting effect on a sequence of images acquired over successive times is illustrated next with regard to FIG. 4.

Figure 4:
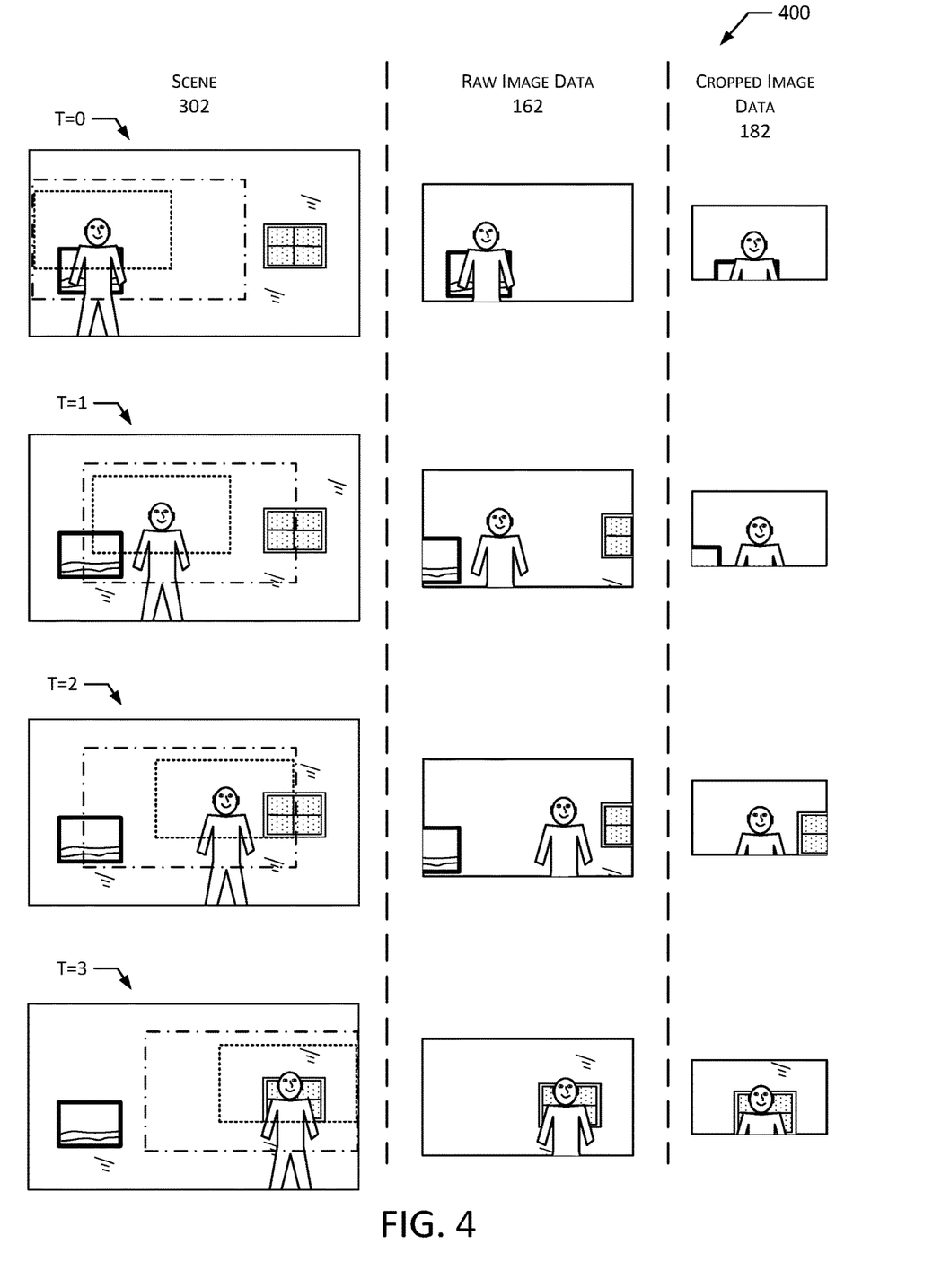
FIG. 4 illustrates a time series of the scene, raw images, and cropped images produced using the system, according to some implementations.

FIG. 4 illustrates a time series 400 of the scene 302, raw image data 162, and cropped image data 182 produced using the system, according to some implementations. In this illustration, time increases down the page, from time t=0 to t=3. In this illustration, the user 202 is moving from left to right in the scene 302. The raw image data 162 shows the image acquired by the camera 114 at the corresponding time.

Jitter in the image may be observed by comparing the raw image data 162 from time t=1 to t=2 in which the position of the user 202, with respect to coordinates in the respective raw images, shifts from left of center at t=1 to right of center at t=2. This jitter results from the discontinuity in motion of the device 100 while panning from left to right to follow the user 202.

However, the jitter has been eliminated in the resulting cropped image data 182. For example, the apparent position of the user 202 is centered in each of the frames of cropped image data 182. The discontinuity has been removed by shifting the cropped image boundary 310 to the right at t=2 to compensate for the orientation variance 208 that was present at time t=2.

In addition to cropping, in some implementations the cropped image may also be scaled to a specified resolution. For example, the cropped image data 182 may be scaled to 1280×720 pixels.

Figure 5:
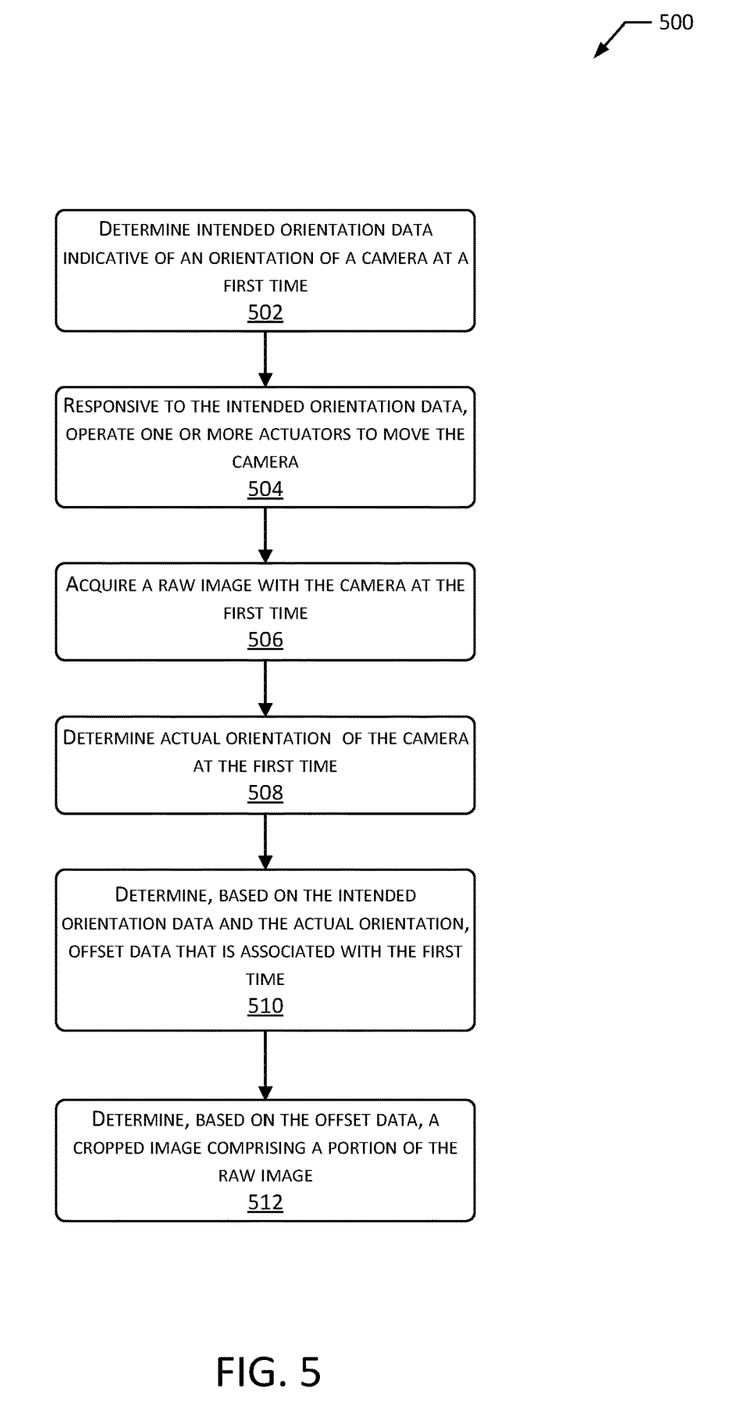
FIG. 5 is a flow diagram of a process for mitigating image jitter by an actuator driven camera, according to some implementations.

FIG. 5 is a flow diagram 500 of a process for mitigating image jitter by an actuator driven camera 114, according to some implementations. The process may be implemented at least in part by one or more of the device 100, a server, and so forth.

At 502, intended orientation data 176 indicative of an orientation of the camera 114 at a first time is determined. For example, a motion module 172 may specify the orientation of the camera 114 at t=1. The camera 114 may have one or more degrees of freedom. For example, the camera 114 may be panned, tilted, rotated, and so forth relative to the physical space.

At 504, responsive to the intended orientation data 176, one or more actuators 142 are operated to move the camera 114. For example, the motion module 172 receives movement instructions indicative of the intended orientation data 176. The motion module 172 then operates a controller to drive the actuator(s) 142 to produce the intended orientation 204.

At 506, a raw image is acquired at the first time. For example, the camera 114 acquires raw image data 162 at t=1. At time t=1 the motion module 172 intends for the camera 114 to be pointed in the intended orientation 204. However, that may not be the case.

At 508 an actual orientation 206 of the camera 114 at the first time is determined. For example, at time t=1 data one or more of the sensors 144 such as the IMU 146, position encoders 148, and so forth is used to determine the actual orientation 206 at that time. Continuing the example, one or more position encoders 148 comprising at least one component mechanically coupled to a structure supporting the camera 114 may send output. This output may be received and used to determine the actual orientation data 174.

In some implementations the raw image data 162 may be used. For example, one or more features may be identified and followed in the raw image data 162 between frames and used to determine the actual orientation 206.

At 510, based on the intended orientation data 176 and the actual orientation data 174, the offset data 180 is determined. The offset data 180 is associated with the first time.

At 512, based on the offset data 180, a cropped image comprising a portion of the raw image is determined. In one implementation, based on the offset data 180, a particular point with respect to rows and columns in the raw image is determined. For example, the particular point may specify a set of coordinates in the raw image. This particular point may be a specified point relative to the cropped image boundary 310, such as a center point, lower left corner, and so forth. The cropped image boundary 310 may be shifted by the offset 314 relative to the raw image boundary 304. Once shifted, the cropped image data 182 is determined. For example, the data associated with the pixels in the raw image data 162 that are within the cropped image boundary 310 may be stored as the cropped image data 182.

Figure 6:
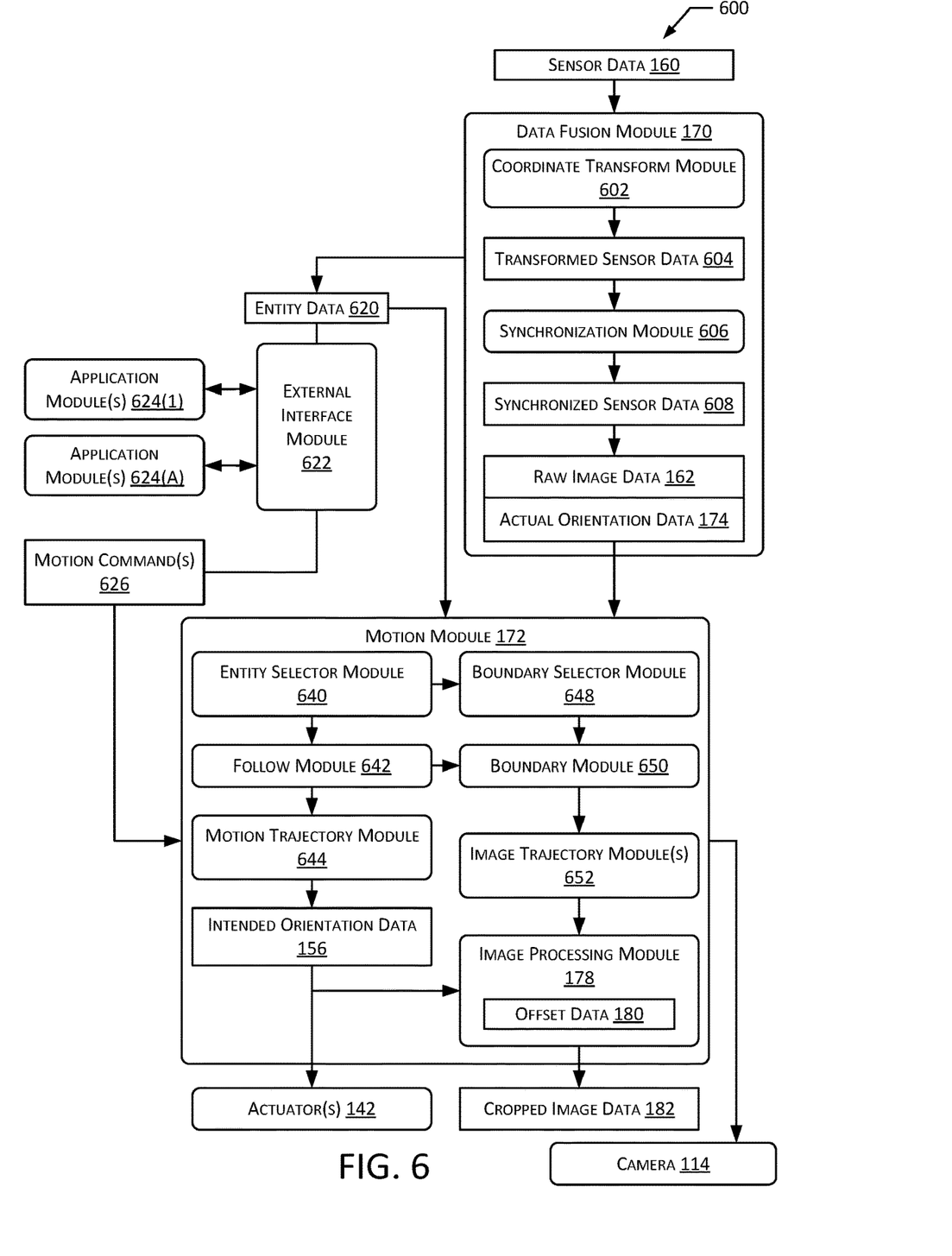
FIG. 6 is a block diagram of a system to control movement of the device, according to some implementations.

FIG. 6 is a block diagram 600 of a system to control movement the device 100, according to some implementations. As described above, the sensor data 160 is provided as input to a data fusion module 170. The data fusion module 170 may perform one or more functions on the sensor data 160 and provide as output entity data 620. A coordinate transform module 602 may accept as input the sensor data 160 and transform the coordinates of the sensor data 160 provided by the sensors 144 into transformed sensor data 604 designated using a common coordinate system. For example, a sonar sensor may provide range and bearing to an obstacle with respect to the body 104. That range and bearing may be converted into a common coordinate system indicative of a location in the physical space, expressed as transformed sensor data 604.

The data fusion module 170 may include a synchronization module 606. The synchronization module 606 generates as output synchronized sensor data 608 that comprises time synchronization from different sensors 144. The synchronization module 606 may accept as input the sensor data 160 or the transformed sensor data 604. For example, the synchronization module 606 may synchronize the actual orientation data 174 and the raw image data 162 and provide that synchronized data to the motion module 172.

In some implementations the data fusion module 170 may generate entity data 620 indicative of an entity. The entity may be an object such as a user or a robot. The entity data 620 may comprise an entity identifier, location as expressed by the common coordinate system, velocity, information about whether the entity is speaking, whether the entity is currently being followed using image data from the camera(s) 114, is currently detected by a computer vision system, is associated with a user identifier, and so forth.

The entity data 620 may be sent to one or more other modules. For example, the entity data 620 may be sent to the motion module 172, an external interface module 622, and so forth. The external interface module 622 provides an interface to application modules 624(1), . . . , 624(A). The application modules 624 may provide particular functionality such as video calls, presentation of entertainment content, taking pictures, and so forth. The external interface module 622 may provide functionality such as an application programming interface (API) to facilitate interaction between the application modules 624 and rest of the system 600.

The external interface module 622 may provide entity data 620 to one or more of the application modules 624. For example, an application module 624 may subscribe to receive entity data 620. The application module 624 may generate and send motion commands 626 to the external interface module 622. The motion commands 626 may comprise instructions to perform a particular following operation, particular sequence of movements, and so forth. For example, the motion command 626 may specify a "follow user" motion is to be implemented. The external interface module 622 may then send the motion commands 626 to the motion module 172.

The motion module 172 may operate, based on one or more of the output from the data fusion module 170 or the motion commands 626. An entity selector module 640 may be used to specify a particular entity for which one or more motions are to be associated with. In one implementation, the entity selector module 640 may determine a selected entity based on user input, previously specified rules, and so forth. For example, priority of a video calling application may be given to the user who initiated the video call. The entity representative of that user may be followed preferentially, disregarding the motion of other users who may be present. The entity selector module 640 may specify an entity that is representative of a particular identified user. The entity selector module 640 sends data associated with the selected entity, such as the entity data 620 for the selected entity, to one or more of a follow module 642 or a boundary selector module 648.

The follow module 642 may comprise a finite state machine that uses the entity data 620 to determine one or more follow actions. This entity data 620 may include information indicative of movement of the entity. The follow module 642 may provide the follow actions and the entity data 620 to a motion trajectory module 644 that determines a proposed trajectory of at least a portion of the device 100 to follow the entity. For example, the motion trajectory module 644 may determine a series of movements of one or more actuators 142. This series of movements may then be used to determine a series of intended orientation data 156 for different times.

The boundary selector module 648 may accept as input the selected entity from the entity selector module 640. The boundary selector module 648 determines the boundary to be associated with the entity. For example, the application module 624 may request that the boundary is to extend only around a head of a user, should include the body of the user, and so forth. The boundary selector module 648 determines the boundary suited to that request.

A boundary module 650 may comprise a finite state machine that accepts as input the selected boundary and determines as output information indicative of a relative placement of the boundary with respect to the raw image data 162. In some implementations an image trajectory module 652 may be used to determine an image trajectory of the boundary with respect to the raw image data 162. The image trajectory may be used to determine placement of the boundary relative to the raw image data 162.

An image processing module 178 may use the intended orientation data 176 and output from the image trajectory module 652 to determine the offset data 180 or other parameters associated with generation of the cropped image data 182.

In some implementations the motion module 172 may determine an apparent position of an entity such as a user's face in the raw image data 162. Different zones of the raw image data 162 may be associated with different types of constraints with regard to movement of the device 100. These constraints may be used to modify operation of the motion module 172. This is discussed in more detail below with regard to FIG. 7.

Figure 7:
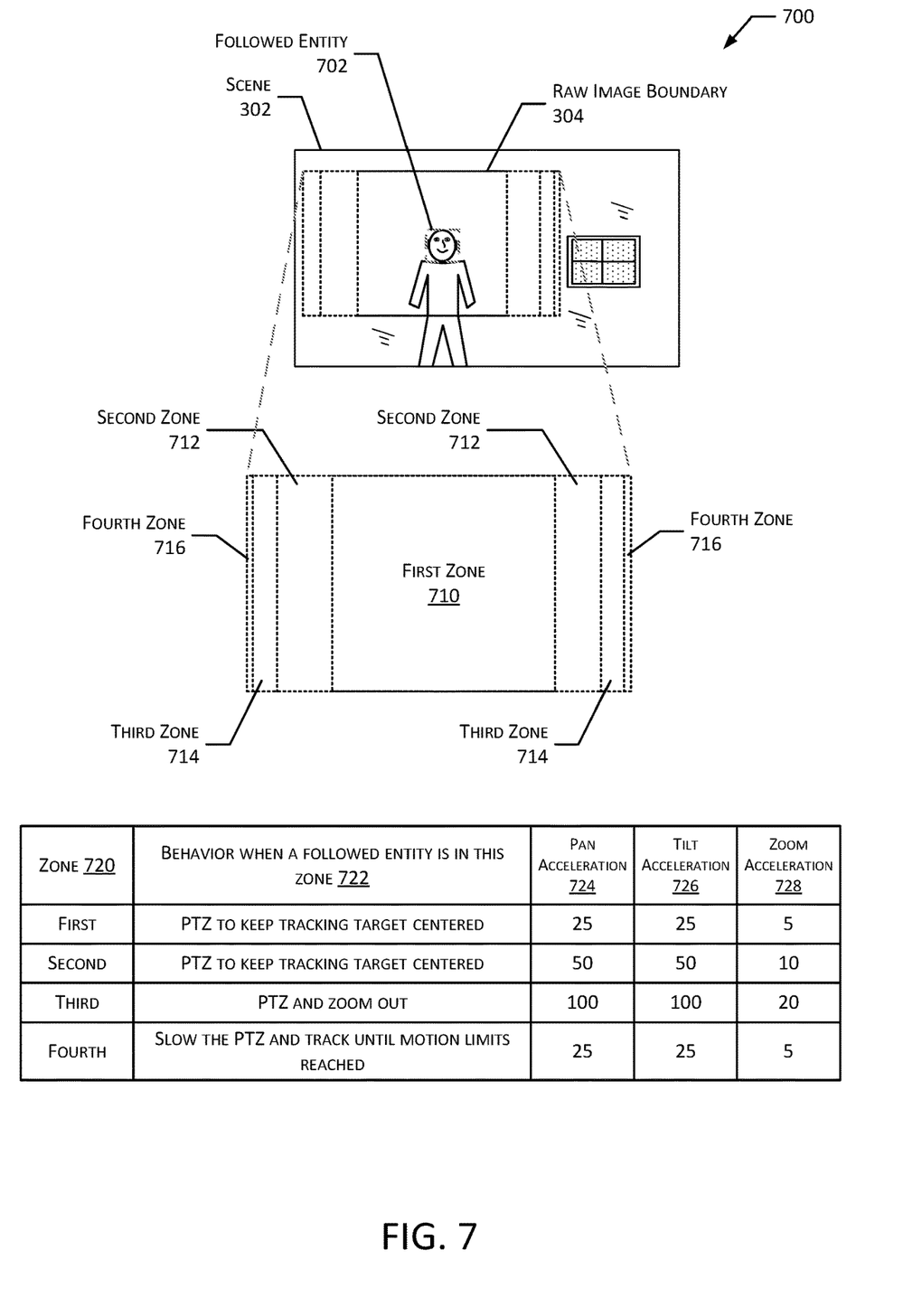
FIG. 7 illustrates the scene and several zones that may be used to determine how the device moves, according to some implementations.

FIG. 7 illustrates the scene 302 and several zones that may be used to determine how the device 100 moves, according to some implementations. As described above, a raw image boundary 304 is depicted that corresponds to a portion of the scene 302 that is within the camera FOV 126 at a given time.

The combination of mechanical motion of the camera(s) 114 due to movement of the actuators 142142 and the ability of the image processing module 178 to shift the boundary used to determine the cropped image data 182 may be used to produce 182 cropped image data 182 that exhibits substantially reduced jitter as well as provides desired relative positioning of the entity in the resulting output. For example, if the device 100 is being used for a video call, the video call application module 624 may request that the user's face be centered in the cropped image data 182.

During use of the device 100, the user or other entity being followed may move with respect to the camera 114. This may result in an undesirable relative position of the entity in the cropped image data 182. For example, the user being depicted in the top left corner of the cropped image data 182. As a result, the motion module 172 attempts to move the device 100 to provide as output cropped image data 182 in which the user appears at a desired relative position in the cropped image data 182. However, if the following action is performed naively, the cropped image data 182 can be distracting or unpleasant to a user. It is desirable to introduce some constraints on the movement both of the actuators 142142 and the relative movement of the cropped image boundary 310 relative to the scene 302. These constraints allow for some tolerance in the apparent position of the entity being followed in the cropped image data 182 and the response of the motion module 172.

The behavior of the motion module 172 may be modified based on the zone 720 in which the followed entity 702 is depicted. Different constraints are associated with the respective zones 720.

A followed entity 702 is shown within a bounding box. For example, the followed entity 702 may comprise a portion of the raw image data 162 that has been designated by the bounding box as shown depicting a face using one or more computer vision algorithms.

The raw image data 162 may be divided into a plurality of zones 720. In this illustration, four types of zones are depicted that designate a total of seven regions in the raw image data 162. A first zone 710 is a square that is centered in the raw image data 162 and comprises approximately 60 percent of the area. To the left and right of the first zone 710 are second zones 712. The second zones 712 are each rectangular and comprise approximately 15 percent of the area. To the left of the left second zone 712 is a left third zone 714. To the right of the right second zone 712 is a right third zone 714. The third zones 714 are each rectangular and comprise approximately 3 percent of the area. To the left of the left third zone 714 is a left fourth zone 716. To the right of the right third zone 714 is a right fourth zone 716. The fourth zones 714 are each rectangular and comprise approximately 2 percent of the area of the raw image.

In other implementations at least two types of zones 720 may be used to designate at least two regions. The relative sizes of the areas of the zones 720 may also vary. For example, the first zone 710 may comprise approximately 50 percent of the area.

A table is shown that relates the various zones 720 to behavior when a followed entity is in this zone 722. Each zone 720 may be associated with constraints. These constraints may comprise a fixed value, range of values, minimum threshold, maximum threshold, and so forth. For example, as shown here each zone 720 is associated with maximum pan acceleration 724, maximum tilt acceleration 726, maximum zoom acceleration 728, and so forth. While a table is depicted, in other implementations other data structures or techniques may be used. For example, the constraints depicted here may be implemented in the finite state machines of the follow module 642, boundary module 650, and so forth.

The motion module 172 may determine the apparent position of the followed entity 702 in the raw image data 162. That apparent position may then be used to determine the zone 720 that is associated with the followed entity 702. Once determined, the constraints associated with that zone 720 may be used by the motion module 172 to determine the cropped image data 182. For example, if the followed entity 702 is the user 202, as the user 202 moves to the right in the scene 302, the motion module 172 will attempt to keep the user 202 centered in the cropped image data 182 while limiting the pan acceleration 724 to a relatively low maximum value while in the first zone 710. As the user 202 moves into the second zone 712, a greater pan acceleration 724 is permitted in an attempt to keep the user 202 properly positioned in the cropped image data 182. As the apparent position of the user 202 in the raw image data 162 moves into the third zone 714, the motion module 172 will zoom out to expand the camera FOV 126 and encompass more of the scene 302 while allowing still greater pan acceleration 724 in an attempt to keep up with the movement of the user 202. As the apparent position of the user 202 moves into the fourth zone 716, the maximum accelerations may be reduced. This reduction prevents the device 100 from attempting to follow the followed entity 702 and moving so swiftly that the actuators 142 or other portion of the device 100 are damaged. The reduction afforded by the fourth zone 716 may also prevent movement or tipping of the device 100 due to the momentum of a mass moved by the actuators 142 suddenly coming to a stop.

In some implementations the raw image data 162, or a downscaled version, may be used by a computer vision system to determine the apparent location of the followed entity 702. For example, downscaled raw image data may be generated from the raw image data 162 by one or more of downscaling to a lower resolution, reducing bit depth, and so forth.

The techniques described herein may be used by other devices and in other situations. For example, an augmented reality device, virtual reality device, mobile phone, tablet, robot, autonomous vehicle, and so forth may use techniques described in this disclosure.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
   a camera;
   an actuator to move the camera;
   a sensor;
   one or more memories storing first computer-executable instructions; and
   one or more processors to execute the first computer-executable instructions to:
      acquire, at a first time, a first image with the camera;
      determine, at the first time, first data indicative of a presence of a user in the first image;
      determine an intended orientation of the camera at a second time, based at least on the first data;
      operate the actuator to move the camera;
      acquire with the camera, at a third time, a second image that includes the user;
      determine, based on the sensor, an actual orientation of the camera at the third time;
      determine offset data based on the intended orientation and the actual orientation; and
      determine a third image based on the offset data, wherein the third image is a portion of the second image.

2. The device of claim 1, wherein the sensor comprises one or more of:
   an accelerometer, or
   a gyroscope; and
   the one or more processors to further execute the first computer-executable instructions to:
   acquire a first output from the sensor at the third time;
   acquire a second output from the sensor at a fourth time, wherein the fourth time is before the third time;
   integrate the first and the second outputs to determine actual movement of the camera; and
   determine the actual orientation based on the actual movement.

3. The device of claim 1, wherein the sensor comprises one or more of:
   a motor encoder associated with the actuator, or
   a position encoder comprising at least one component mechanically coupled to a structure supporting the camera; and
   the one or more processors to further execute the first computer-executable instructions to:
   receive output from the sensor; and
   determine, based on the output, the actual orientation.

4. The device of claim 1, wherein:
   the camera is moveable in one or more degrees of freedom; and
   the offset data is indicative of a displacement along a horizontal axis with respect to the first image.

5. The device of claim 1, wherein the first computer-executable instructions to determine the third image further comprising instructions to:
   determine, based on the offset data, a first set of coordinates in the second image;
   associate a corner of an image boundary with the first set of coordinates; and
   wherein the third image comprises data associated with pixels within the image boundary.

6. The device of claim 1, wherein:
   the intended orientation is indicative of a first angle;
   the actual orientation is indicative of a second angle; and
   the one or more processors to further execute the first computer-executable instructions to:
      determine a difference between the first angle and the second angle; and
      retrieve, from the one or more memories, the offset data based on the difference.

7. The device of claim 1, wherein the intended orientation and the actual orientation are representative of one or more angular values with respect to one or more axes.

8. A method comprising:
   acquiring, at a first time, a first image with a camera of a device;
   determining, at the first time, first data indicative of a presence of an entity in the first image;
   determining a first apparent position of the entity as represented in the first image;
   determining an intended orientation, at a second time, of at least a portion of the device that comprises the camera, based on one or more of the first data or the first apparent position of the entity;
   operating an actuator to move the at least a portion of the device that comprises the camera;
   acquiring, at a third time, a second image that includes the entity with the camera;
   determining, based on output from one or more sensors, an actual orientation of the camera at the third time;
   determining offset data based on the intended orientation and the actual orientation; and
   determining a third image based on the offset data, wherein the third image is a portion of the second image that includes the entity.

9. The method of claim 8, wherein the determining the third image comprises:
   determining, based on the offset data, a first set of coordinates in the second image;
   associating a corner of an image boundary with the first set of coordinates; and
   wherein the third image comprises data associated with pixels in the second image that are within the image boundary.

10. The method of claim 8, wherein the intended orientation and the actual orientation are representative of one or more angular values with respect to one or more axes.

11. The method of claim 8, wherein:
   the intended orientation is indicative of a first angle;
   the actual orientation is indicative of a second angle; and
   the determining the offset data comprises:
      determining a difference between the first angle and the second angle; and retrieving the offset data that is indicative of a number of pixels from a data structure based on the difference.

12. The method of claim 8, wherein the determining the actual orientation comprises:
   acquiring output from an inertial measurement unit from a fourth time until the third time, wherein the fourth time is before the third time; and
   integrating the output to determine actual movement of the camera.

13. The method of claim 8, wherein the determining the actual orientation comprises:
   receiving output from a position encoder.

14. The method of claim 8, wherein:
   the camera is moveable with respect to one or more axes; and
   the offset data is indicative of columns of the second image.

15. The method of claim 8, further comprising:
   operating the actuator responsive to the intended orientation.

16. The method of claim 8, wherein the determining the intended orientation further comprises:
   acquiring a first set of images before the second time, wherein the first set of images comprises the first image;
   determining a plurality of locations indicative of, for each image in the first set of images, a location in each image of the entity depicted in that image; and
   determining a trajectory of the entity based on the plurality of locations.

17. A device comprising:
   an actuator;
   a plurality of sensors, the plurality of sensors comprising at least one camera;
   one or more memories storing first computer-executable instructions; and
   one or more processors to execute the first computer-executable instructions to:
      acquire, at a first time, first sensor data using the plurality of sensors, wherein the first sensor data comprises first image data acquired with the at least one camera;
      determine, based on the first sensor data, first data that is indicative of a presence and first location of a user with respect to the device at the first time;
      determine a first apparent position of the user represented in the first image data;
      determine that the first apparent position is within a first zone of the first image data;
      determine first intended orientation data of the at least one camera at a second time, based on one or more of the first data or the first apparent position;
      responsive to the first intended orientation data and the first apparent position within the first zone, operate the actuator to move at least a portion of the device that includes the at least one camera;
      acquire, at a third time, second sensor data using the plurality of sensors, wherein the second sensor data is indicative of a first actual orientation of the at least a portion of the device that was moved by the actuator;
      determine offset data based on the first intended orientation data and the first actual orientation; and
      determine, based on the offset data, second image data that is a portion of the first image data.

18. The device of claim 17, wherein the plurality of sensors further comprises one or more of:
   an accelerometer,
   a gyroscope,
   a microphone array,
   a depth camera,
   sonar,
   radar, or
   a radio receiver.

19. The device of claim 17, wherein the plurality of sensors comprise a microphone array; and
   the one or more processors to further execute the first computer-executable instructions to:
      determine, based on third sensor data from the microphone array, the presence and the first location of the user; and
      determine the first apparent position of the user in the first image data using one or more computer vision algorithms.

20. The device of claim 17, wherein the movement of the at least a portion of the device is constrained to less than a first threshold while the first apparent position is within the first zone; and
   the one or more processors to further execute the first computer-executable instructions to:
      acquire, at a fourth time, third sensor data, wherein the third sensor data comprises third image data acquired with the at least one camera;
      determine a second apparent position of the user in the third image data;
      determine that the second apparent position is within a second zone of the third image data;
      determine second intended orientation data of the at least one camera at a fifth time, based on one or more of the first data or the second apparent position within the second zone; and
      responsive to the second intended orientation data and the second zone, operate the actuator to move the at least a portion of the device that includes the at least one camera at a rate that is greater than the first threshold and less than a second threshold.

* * * * *

UNITED STATES PATENT AND TRADEMARK OFFICE
CERTIFICATE OF CORRECTION

| | | |
|---|---|---|
| PATENT NO. | : 11,265,469 B1 | |
| APPLICATION NO. | : 16/845651 | |
| DATED | : March 1, 2022 | |
| INVENTOR(S) | : Gangwal et al. | |

It is certified that error appears in the above-identified patent and that said Letters Patent is hereby corrected as shown below:

On the Title Page

Missing Reference under item "(56) References Cited" should read:
--2006/0274156 Rabbani et al.--

Signed and Sealed this
Thirty-first Day of May, 2022

Katherine Kelly Vidal
*Director of the United States Patent and Trademark Office*